United States Patent [19]

Snider

[11] Patent Number: 4,471,250

[45] Date of Patent: Sep. 11, 1984

[54] HUB ASSEMBLY FOR DYNAMOELECTRIC MACHINE AND METHOD OF MAKING SAME

[75] Inventor: S. Duke Snider, St. Louis County, Mo.

[73] Assignee: Emerson Electric Co., St. Louis, Mo.

[21] Appl. No.: 435,729

[22] Filed: Oct. 21, 1982

[51] Int. Cl.³ ............................................. H02K 7/00
[52] U.S. Cl. .................................. 310/67 R; 310/43; 310/90; 310/157
[58] Field of Search ...................... 310/43, 90, 157, 67

[56] References Cited

U.S. PATENT DOCUMENTS 2,522,941  9/1950  Gillen .............................. 310/157 X
3,458,740  9/1969  Kaneko et al. ....................... 310/67
4,357,550  11/1982  Müller .............................. 310/157 X Primary Examiner—Donovan F. Duggan
Attorney, Agent, or Firm—Polster, Polster and Lucchesi

[57] ABSTRACT

A dynamoelectric machine (e.g., an induction motor for an overhead ceiling fan or the like) is disclosed having a stator assembly and a rotor assembly with the stator assembly comprising a bearing support or end shield, a core mounted within the bearing support with the core having a bore therethrough for rotatably receiving the rotor body of the rotor assembly. The end shield has a central shaft stationarily mounted relative thereto and a pair of bearings, preferably ball or roller bearings, is provided for journalling the rotor body on the stationary shaft. More specifically, the rotor assembly includes a hub having a generally cylindrical body on which the rotor body is secured by means of an interference or shrink fit with the hub body having a longitudinal central opening therethrough receiving the stationary shaft and further having a mounting flange on its outer end.

3 Claims, 6 Drawing Figures

HUB ASSEMBLY FOR DYNAMOELECTRIC MACHINE AND METHOD OF MAKING SAME

BACKGROUND OF THE INVENTION

This invention relates to a hub assembly for a dynamoelectric machine and to a method of making the hub assembly. More particularly, this invention relates to an AC induction motor which has particular application in a ceiling fan. However, those skilled in the art will recognize the wider applicability of the inventive concepts hereinafter disclosed.

In most conventional ceiling fan applications, a stator assembly is typically provided which includes a core made of a stack of plate-like laminations having a central bore extending longitudinally therethrough with a number of blind slots extending radially outwardly from the bore. A plurality of coils of wire is inserted into selected slots of the core so as to form the windings of the motor. A rotor assembly including a rotor body is journalled relative to the stator assembly such that the rotor body is concentrically mounted within the bore of the stator core and such that the rotor assembly is free to rotate relative to the stator core. The rotor body may be of squirrel cage construction having a core made of a plurality of laminations of suitable ferro-magnetic material with longitudinal slots therethrough in which conductor bars of die cast-in-place aluminum or the like are formed with end rings cast-in-place on the end faces of the rotor body to electrically interconnect the conductor bars.

In overhead ceiling fan applications, the stator assembly is typically mounted within an end shield or bearing support member which is adapted to be hung from the ceiling by means of a pipe connector or the like. The rotor assembly is journalled relative to this end shield by means of anti-friction roller (ball) bearings and the rotor assembly includes a hub which rotates with the rotor body with the fan blades being mounted on the flange for rotation with the rotor assembly. In many overhead ceiling fan applications, it is desirable to have a stationary wire raceway extending down through the rotor assembly, this raceway comprising a stationary tube or pipe. On the bottom of this stationary pipe, below the level of the rotating hub on which the fan blades are mounted, a switch housing may be provided in which a control switch may be mounted. Also, other electrical appliances, such as lighting fixtures or the like, may be mounted on this switch housing below the level of the rotating hub.

Even more specifically, this invention is an improvement of the coassigned U.S. patent application Ser. No. 368,397, filed Apr. 14, 1982, for Dynamoelectric Machine Structure and Method, invented by Neal B. Royer in whch a novel system of attaching the hub to the rotor and of journalling the hub relative to the stationary central shaft is disclosed. This results in a structure which is lightweight, which simplified construction of the motor, and which is aesthetically appealing. The rotor assembly and hub of the prior invention disclosed in U.S. patent application Ser. No. 368,397 is illustrated herein in FIG. 6. As can be seen, the rotor body has a central bore therethrough and the hub assembly has a cylindrical body section. As disclosed in the aforementioned patent application, the rotor core is heat shrunk (i.e., interference fitted) on the exterior of the cylindrical hub body. As is further shown in FIG. 6, two antifriction, roller element bearings are press fit into respective inner cylindrical surfaces within the hollow cylindrical body of the hub assembly. It will be seen in FIG. 6, that one of the bearing assemblies (i.e., the upper bearing assembly) overlaps at least a portion of the rotor body which is heat shrunk into a tight interfering fit relation on the exterior of the hub body prior to the press fit insertion of the rolling element bearing assembly into its respective inner cylindrical surface. It has been found that after the rotor body core is heat shrunk onto the outer surface of the hub body, this heat shrinking or interference fit assembly technique sometimes causes distortion of the inner cylindrical surface of the hub into which this one bearing is to be press fit. Thus, during installation of the bearing, exceedingly high forces may be applied to the outer race of the bearing which results in the pinching or bindng of the roller elements of the bearing. On account of these bearing deformation problems, it is necessary to hold extremely accurate tolerances on the outer cylindrical surface onto which the rotor body is heat shrunk and also to hold extremely close tolerances on the inner cylindric surfaces into which the bearings are press fit. The tolerances of both the diameters of these inner and outer cylindrical surfaces and also the concentricity of the two surfaces must be maintained. This necessity of holding tight tolerances adds appreciably to the cost of producing these motors.

SUMMARY OF THE INVENTION

Among the several objects and features of this invention will be noted the provision of a hub assembly for a dynamoelectric machine and a method of making the hub assembly similar to the construction of the hub assembly heretofore described and shown in U.S. patent application Ser. No. 368,397 in which distortion of the inner cylindrical surface into which one of the bearings is to be inserted is minimized during heat shrinking of the rotor body onto the outer cylindrical surface of the hub;

The provision of such a hub assembly and method which allows greater dimensional tolerances of both the outer cylindrical surface of the hub body and of the inner cylindrical surface receiving the bearing assembly, both in diameter and in out of roundness, without resulting in the pinching or deformation of the bearing once the latter is pressed into position within the inner cylindrical surface of the hub;

The provision of such a hub assembly and method in which the insertion of the bearing into the hub is greatly facilitated; and The provision of such a hub assembly and method which, through the advent of greater tolerances (i.e., more interference and greater out of roundness) simplifies manufacture, lessens the number of inspections, increases production speeds, and reduces the number of rejected parts thereby permitting the more economical manufacture of the hub assembly and rotor assembly.

Other objects and features will be in part apparent and in part pointed out hereinafter.

Briefly stated, a dynamoelectric machine (e.g., an induction motor), has a stator assembly and a rotor assembly. The stator assembly is defined to comprise a bearing support or end shield, a core mounted within the bearing support, this core comprising a plurality of laminations of suitable ferro-magnetic material. The core has a central bore extending longitudinally therethrough. The rotor assembly is defined to comprise a rotor body rotatably mounted within the bore of the stator core, the rotor body having a central bore therethrough. The bearing support or end shield has a central shaft stationarily mounted relative thereto with the longitudinal centerline of this shaft being substantially coaxial with the central axis of the rotor body and with the stator core. Further, means is provided for journalling the rotor body on the stationary shaft. The rotor assembly includes a hub having a generally cylindrical hub body portion which is received in the rotor body bore and on which the rotor body is fixedly mounted. The hub is rotatable with the rotor body and has a longitudinal central opening therethrough for receiving the stationary shaft. A pair of antifriction bearings spaced axially from one another along the stationary shaft is provided with each of these bearings having an outer race engagable with and being rotatable with a respective inner cylindrical surface of the hub body and an inner race engageable with and remaining stationary with the stationary shaft. Further, each of the bearings includes a plurality of rolling elements between the inner and outer races. Specifically, the improvement of this invention is defined to comprise an outer cylindrical surface on the exterior of the hub body receiving the rotor body and onto which the rotor body is interference fit (i.e., affixed) and an inner cylindrical surface on the interior of the cylindrical hub body which receives the outer race of one of the bearings upon the press fit insertion of this one bearing into its respective inner cylindrical surface within the hub body. The outer and inner cylindrical surfaces of the hub body are spaced axially along the cylindrical hub body with the diameter of the exterior of the cylindrical hub body at the axial location of the inner cylindrical surface receiving the one bearing being smaller than the diameter of the hub body at the outer cylindrical surface on which the rotor body is mounted such that the exterior of the cylindrical hub body at the axial position of the inner cylindrical surface is clear of the rotor body when the latter is affixed on the exterior of the cylindrical hub body. Further, the thickness of the hub between the outer surface of the hub at the axial location of the one inner cylindrical surface and the one inner cylindrical surface is less than about 0.85 times the thickness of the outer race of this one bearing thereby to prevent undue distortion of the one bearing upon the press fit of the one bearing into the hub after the rotor body has been mounted or affixed on the exterior of the hub.

A method of mounting a rotor body on a first exterior surface of a hub body and of press fitting an anti-friction roller bearing within the interior of the hub body is disclosed in which the rotor body at least partially axially overlaps the bearing and in which the bearing is not unduly distorted. Specifically, this method is defined to comprise the steps of forming an inner cylindrical surface on the interior of the hub which has an inside diameter slightly less than the outside diameter of the outer race of the bearing to be press fit therein. Then, another exterior surface is formed on the exterior of the hub at generally the same axial position along the hub as the inner cylindrical surface into which the bearing is to be press fit with this last-mentioned exterior cylindrical surface having an outer diameter less than the diameter of the outer cylindrical surface which receives and which has an interference fit with the rotor body. The thickness of the hub between the other exterior cylindrical surface and the inner cylindrical surface is less than about 0.85 times the thickness of the outer race of the bearing. Then, the rotor body is shrink fitted onto the first outer cylindrical surface of the hub such that the rotor body at least in part axially overlies the inner cylindrical surface receiving the bearing and is spaced clear of the other exterior surface of the hub. Then, the bearing is press fit into the inner cylindrical surface of the hub thereby to prevent undue distortion of the bearing upon the press fit insertion thereof after the rotor body has been shrink fitted onto the exterior of the hub.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
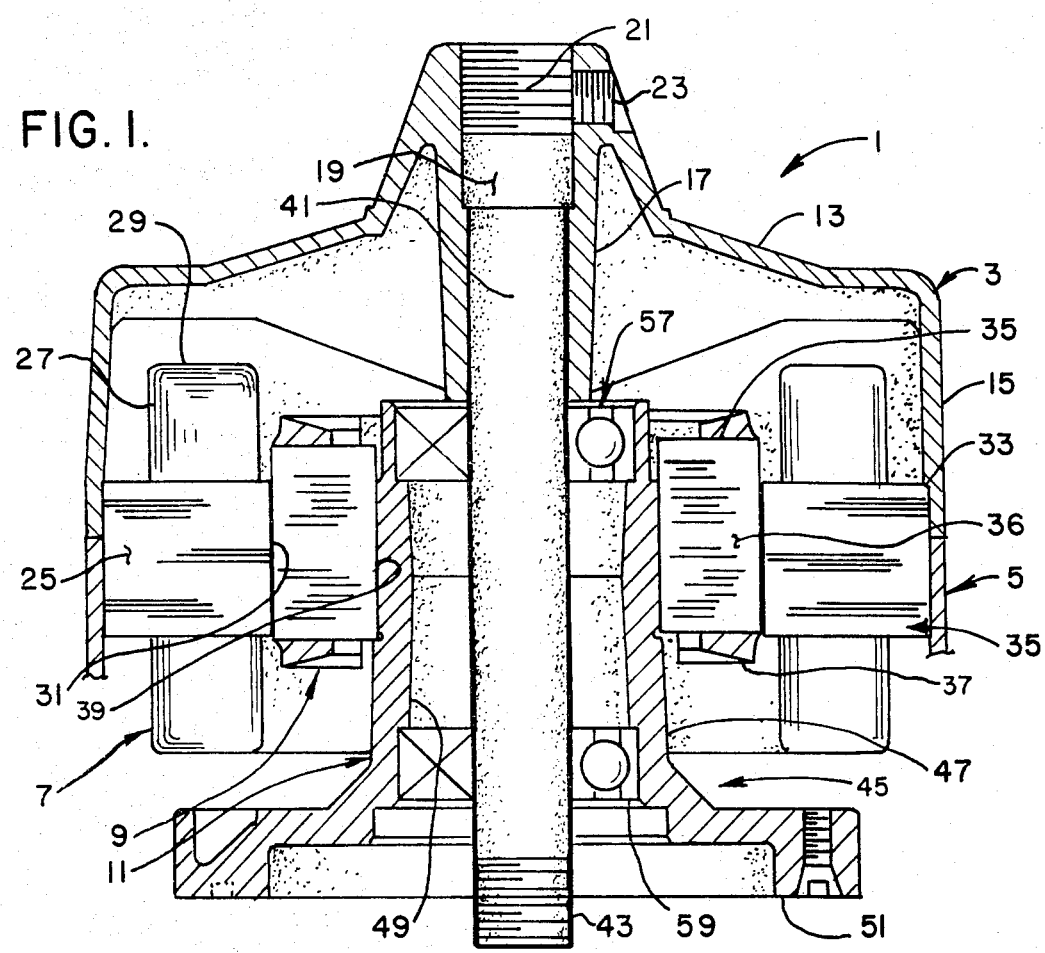
FIG. 1 is a vertical cross-sectional view of a dynamoelectric machine (e.g., an AC induction motor) of the present invention illustrating an end shield, a stator assembly mounted within the end shield, a central hollow stationary shaft, and a rotor assembly including a hub journalled on the hollow stationary shaft in accordance with this invention.

Referring now to the drawings, an AC induction motor or dynamoelectric machine, is shown to be indicated in its entirety by reference character 1. Specifically, motor 1 is a motor which has been particularly adapted for application with an overhead ceiling fan for room ventilation purposes. As previously mentioned, this invention is an improvement of the dynamoelectric machine disclosed in the coassigned U.S. patent application Ser. No. 368,397, filed Apr. 14, 1982 and invented by Neal B. Royer. This abovementioned U.S. patent application is herein incorporated by reference in this specification and should be referred to for a more complete discussion of the construction of the motor herein described and its application. As has been heretofore pointed out, the improvement of this invention relates specifically to the hub assembly of the motor and to the manner in which the rotor is mounted on the hub and the manner in which the bearings which journal the rotor assembly are mounted relative to the hub. For that reason, a detailed description of the construction of motor 1 and its operation are not herein set forth as they are believed to be well known to those skilled in the art. However, a brief description of the construction and operation of motor 1 will be herein set forth so as to enable those skilled in the art to make and use the improvement of the present invention.

More specifically, motor 1 is shown to comprise an end shield or bearing support, as generally indicated at 3. In FIG. 1, the motor is shown in its normal installed position in which the longitudinal centerline of the motor is disposed vertically. A decorative end turn cover, as indicated at 5, is fitted to the bottom end of end shield 3, but as shown in FIG. 1, the end turn cover 5 is broken away so as to more clearly illustrate the construction of motor 1.

As is typical in overhead ceiling fan applications, the motor may be a multiple pole motor (for example, an 18 pole motor) of the permanent split capacitor (PSC) type such that the motor operates at a relatively low synchronous speed. In addition, the motor may be provided with suitable speed controls for operating the motor at a high speed mode of operation (e.g., 220 rpm), a medium speed mode of operation (e.g., 120 rpm), and a slow speed mode of operation (e.g., 45–50 rpm). However, for purposes of this invention, the speed control and the speeds at which the motor operate are not an essential part of this invention and thus will not be described in detail.

Motor 1 is shown to comprise a stator assembly, as generally indicated at 7, together with a rotor assembly 9 and means, as indicated at 11, for rotatably mounting the rotor assembly 9 with respect to end shield 3 and stator assembly 7. End shield 3 is shown to be a unitary casting of a suitable metal alloy (e.g., aluminum or the like) having a top wall 13 and a cylindrical side wall 15. A centrally located end shield mounting hub 17 extends downwardly (i.e., inwardly) into the end shield and has a central opening 19 therewithin. At the upper end of the central opening, threads 21 are provided for threadably receiving a mounting pipe (not shown) which is utilized to suspend the motor and overhead ceiling fan from a suitable support structure secured to the ceiling of a building or the like. A set screw 23 is provided in the side of mounting hub 17 which may be tightened against the mounting pipe after the latter has been threadably inserted into threads 21 thereby to positively lock motor 1 onto the mounting pipe.

Stator assembly 7 is shown to comprise a core 25 made up of a stack of plate-like laminations of suitable ferro-magnetic material. The core has a central opening therethrough and has a number of slots extending radially outwardly from the central bore. A plurality of coils of wire is inserted in these slots so as to constitute windings 27. it will be understood that the construction of the core, the slots, and windings 27 are conventional and do not, per se, constitute a part of this invention. Further, each of the windings includes end turns 29. The central openings in each of the laminations form a bore 31 of core 25 with the rotor assembly 9, as shown in FIG. 1, being coaxial with and being rotatably mounted within bore 31. The inner lower surface of sidewall 15 of end shield 3 is provided with a core receiving surface 33 thereby to accurately locate core 25 relative to end shield 3.

Figure 4:
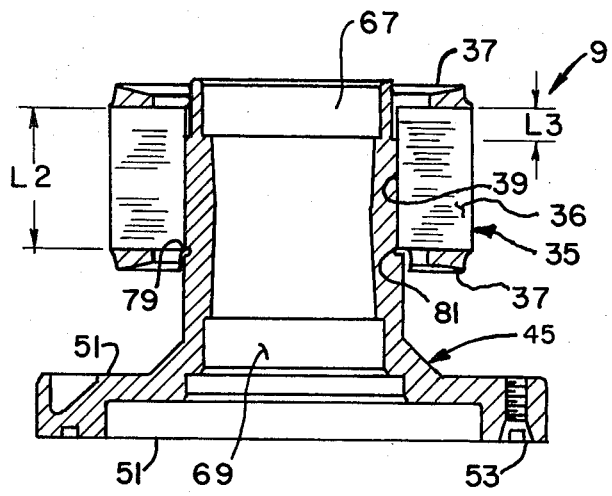
FIG. 4 is a view of the hub similar to FIG. 3 with a rotor body of squirrel cage construction affixed (i.e., shrink fitted) onto a respective outer cylindrical surface of the hub body.
Figure 5:
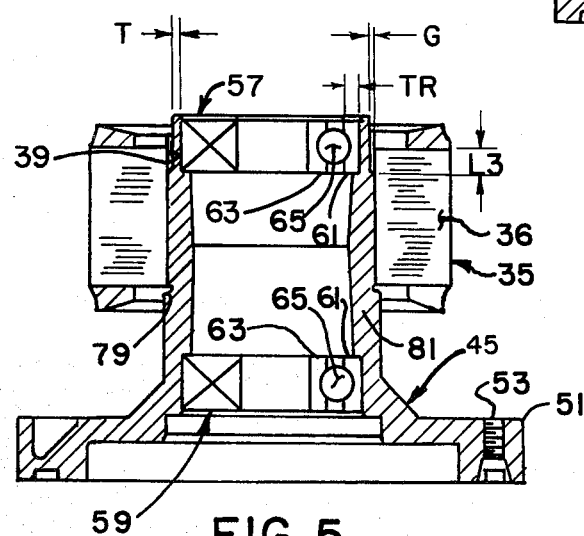
FIG. 5 is a view similar to FIG. 4 illustrating a pair of anti-friction rolling element bearing assemblies press fitted into respective inner cylindrical surfaces formed on the interior of the hollow hub body with one of the bearings (i.e., the top bearing) at least in part axially overlapping with the rotor body and with the hub body constructed in accordance with this invention so as to minimize distortion of the bearing when the latter is press fit into the hub.

Rotor assembly 9 is shown to comprise a rotor body 35 of conventional squirrel cage construction having a core 36 made of a stack of platelike ferro-magnetic laminations. As is conventional, these laminations have a number of axial openings (not shown) generally adjacent the periphery of the rotor body forming slots extending longitudinally through the rotor body. Conductor bars (not shown) and end rings 37 (as shown in FIGS. 4 and 5) are integrally die cast in place on rotor body 35 of suitable electrically conductive material (e.g., aluminum) so as to constitute the conductor bars and end rings of a squirrel cage rotor assembly. Further, rotor body 35 has a central rotor bore 39 extending longitudinally therethrough.

A stationary hollow shaft 41 is rigidly affixed (i.e., press fit) in the lower end of end shield mounting hub 17. Thus, this shaft remains stationary relative to the end shield and to stator assembly 7. The lower end of shaft 41 is shown to be provided with threads 43 for mounting a switch housing or the like (not shown).

Figure 2:
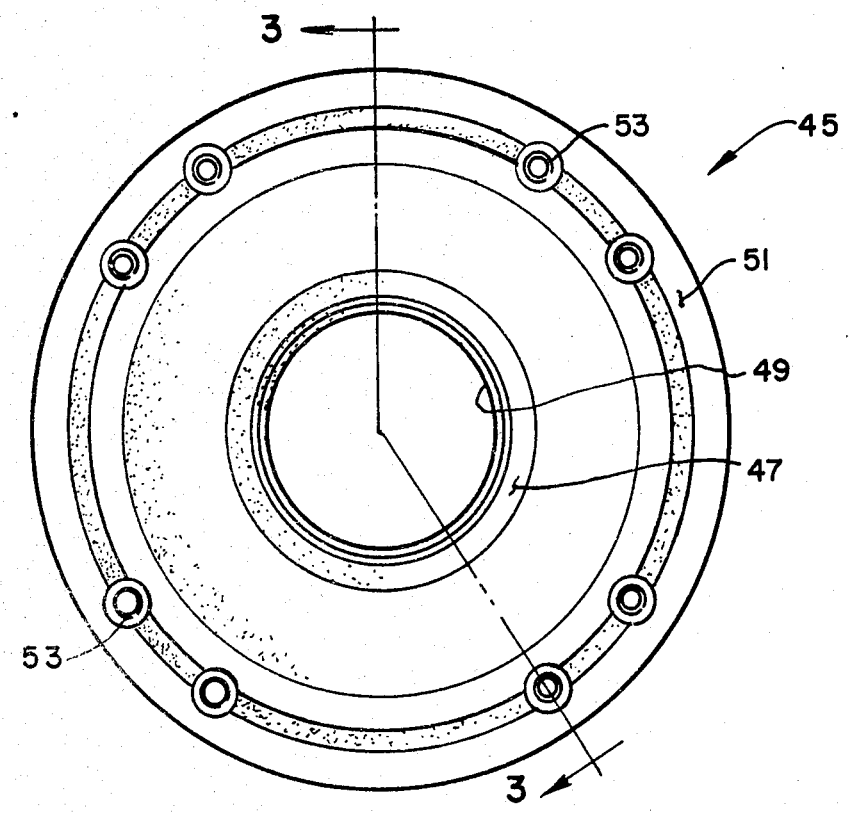
FIG. 2 is a bottom plan view of the hub assembly illustrated in FIG. 1.

In FIG. 1, means 11 for rotatably mounting rotor assembly 9 relative to end shield 3 and to stator assembly 7 is shown to comprise a unitary hub, as generally indicated at reference character 45. This hub includes a cylindrical hub body 47 having a central bore 49 extending longitudinally therethrough with an integral circular flange 51 at the lower end of cylindrical hub body 47. Flange 51 is provided with a plurality of mounting holes 53 (best shown in FIG. 2) for permitting the fan blades (not shown) of an overhead ceiling fan to be rigidly affixed to hub 45 for rotation therewith. As shown, the lower threaded end 43 of stationary shaft 41 extends below the level of flange 51.

Figure 3:
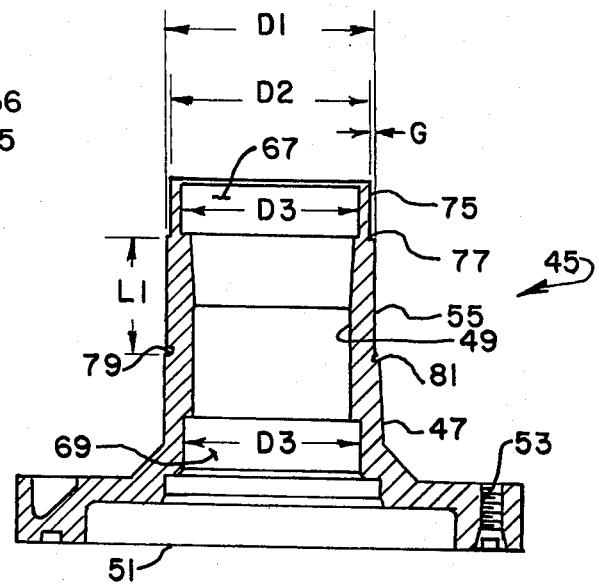
FIG. 3 is a vertical cross-sectional view of the hub on a somewhat smaller scale.

REferring to FIG. 3, hub 45 is shown to have an outer cylindrical machined surface 55 thereon extending axially along the outer surface of the hub body, as indicated by dimension L1. As shown in FIGS. 1 and 5, the rotatable mounting means 11 further includes a first anti-friction, roller element bearing 57 and a second anti-friction, rolling element bearing 59 (e.g., a ball bearing) mounted within central bore 49 of the cylindrical hub body 47 thereby to journal rotor assembly 9 relative to stationary shaft 41 carried by end shield 3. Each of these bearings 57 and 59 includes an outer race 61 adapted to have a force or interference fit with a respective cylindrical inner surface (as will be hereinafter specified) of cylindrical hub body 47, and inner race 63 adapted to have a tight interference fit with the outer surface of stationary shaft 41. Further, a plurality of rolling elements (e.g., balls) 65 is interposed between the outer and inner races of each of the bearings.

Again referring to FIG. 3, a first inner cylindrical surface, as indicated at 67, is provided within the hub body 47 for receiving the first bearing 57 and a second inner cylindrical surface 69 is provided within the hub body for receiving the second bearing 59. Each of these inner cylindrical surfaces 67 and 69 is provided with a respective shoulder, 71 and 73, engageable with the inner radial face of the outer bearing races 61 of bearings 57 and 59 upon the press fit insertion of the bearings into their respective inner cylindrical surfaces thereby to accurately locate the bearings in axial direction with respect to hub body 47. It will be understood that the inner cylindrical surfaces 67 and 69 are generally coaxial with respect to the longitudinal centerline of hub body 47.

Still referring to FIG. 3, a second exterior cylindrical surface, as indicated at 75, is provided on the end of hub body 47. The diameter of the first exterior (or outer) cylindrical surface 55, as indicated by D1, is somewhat greater than the outer diameter, as indicated by D2, of the second exterior cylindrical surface 75. A transition step 77 is provided between the larger diameter outer surface 55 and the smaller diameter exterior surface 75. The inner diameters of the first and second inner cylindrical surfaces 67 and 69 are indicated by reference characters D3. It will be understood that the outer diameters of outer races 61 of bearings 57 and 59 are of somewhat larger diameter than diameters D3 such that there is an interference fit between the outer surfaces of the outer races 61 of the inner bearings and the cylindrical surfaces 67 and 69 of hub body 47 so as to affix the outer races relative to the hub body upon the press fit of the bearings into the hub body.

As shown in FIG. 5, the thickness of outer race 61 of bearing 57 is indicated by reference character TR. Further, the thickness of the outer end of hub body 47 between inner cylindrical surface 67 and the second exterior cylindrical surface 75 is indicated by dimension T. In accordance with this invention, for purposes as will be hereinafter set forth, it is preferred that the ratio T/TR be less than about 0.85.

As heretobefore mentioned, rotor body 35 has a central bore 39 therethrough. Preferably, the inside diameter of rotor bore 39 is somewhat less than the diameter D1 of the outer cylindrical surface 55. At the inner end of cylindrical surface 55 toward flange 51, a shoulder 79 is provided and, adjacent shoulder 79, the cylindrical body 47 of the hub is undercut, as indicated at 81, for purposes as will appear. As shown in FIGS. 4 and 5, the axial length of the core of rotor body 36 is indicated by length L2 and the length of the rotor body is somewhat greater than the axial length L1 of surface 55 such that the rotor body extends axially beyond shoulder 79 and at least in part overlies the second exterior cylindrical surface 55, as indicated by dimension L3.

Upon assembling rotor assembly 9, rotor body 35 is heat shrink fit (i.e., affixed) onto outer cylindrical surface 55 of hub body 47 by varying temperatures of the rotor body and/or of hub 45 so as to permit hub body 47 to be forceably slid into rotor body bore 39 until the inner face of the rotor body engages shoulder 79 thereby to properly locate the rotor body in axial direction with respect to hub 45. Undercut 81 insures that rotor body 35 may fully bear against shoulder 79 without interference with any radius between exterior surface 75 and shoulder 79. Upon the temperature of the rotor body and the hub equalizing, rotor body 35 will be securely affixed to and will be rotatable with hub 45. Because the length of the rotor body core 36, as indicated by dimension L2, is greater than the length L1 of the outer cylindrical surface 55 on cylindrical hub body 47, it is seen in FIGS. 4 and 5 that the outer or upper end of the rotor body extends axially beyond shoulder 77 so as to overlap, at least in part, a portion of the second exterior cylindrical surface 75 on the outer end of the hub body. Further, it will be noted that the overlapped portion of rotor body 36, as indicated by dimension L3, is clear of the inner diameter of the rotor body, as separated by a gap G (see FIG. 5).

Upon press fitting bearing 57 into its respective inner cylindrical surface 67, it will be appreciated that due to the above-specified ratio of the thickness of the outer end of hub body 47, as indicated by dimension T, relative to the thickness TR of the outer end of the outer race of the bearing (i.e., T/TR is less than about 0.85), a slight amount of deflection of the outer end of the hub body will occur before undue compressive forces are applied to outer race 61 of bearing 57 such as would cause deformation of the outer race which in turn would cause pinching or binding of rolling elements 65 between the inner and outer races of the bearing. Further, because the portion of rotor body 35, as indicated by dimension L3, which overlaps with outer cylindrical surface 75 of the cylindrical portion 47 of the hib is separated from the hub by gap G, the outer end of the hub is free to deflect radially outwardly substantially without restraint from the rotor body which has been previously heat shrunk onto the outer surface 55 of the hub body thus further aiding in the press fit insertion of the one bearing 57 into the hub body without undue deformation or binding of the bearing 57.

In this manner, it will be understood that the bearing 57 may be press fit into the hub substantially without deformation and yet the dimensional tolerances both on out of roundness of cylindrical surfaces 55, 67 and 69 and on the diameters of the various surfaces 55, 67 and 69 of the hub body may be increased thereby to permit more out of roundness and dimensional variations of the diameters of surfaces 55, 67 and 69 than was heretofore possible with prior art hub designs, and yet, surprisingly, binding of the bearings is substantially reduced.

Figure 6:
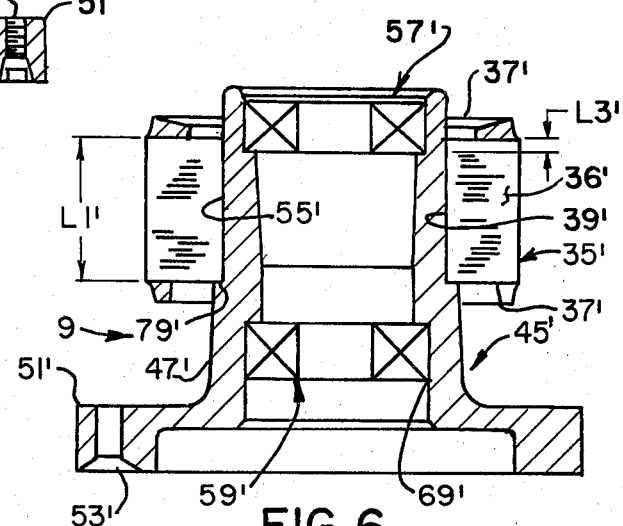
FIG. 6 is a vertical cross sectional view of a rotor body shrink fitted on a prior art hub, this rotor assembly being similar to the rotor assembly disclosed in the aforementioned coassigned U.S. patent application Ser. No. 368,397.

Referring now to FIG. 6, a prior art rotor assembly, such as is utilized with the above-mentioned coassigned U.S. patent application Ser. No. 368,397, is indicated in its entirety by reference character 9'. It will be understood that this prior art rotor assembly includes a hub 45' generally similar to hub 45 of the present invention described above but for the above-discussed ratio of the thickness of the outer race 61 of bearing 67 to the thickness of the outer end of the hub (i.e., the ratio T/TR), and but for the provision of gap G between the portion of rotor body 35 which axially overlaps bearing 57. In FIG. 6, the "primed" reference characters indicate parts correspondng in construction to the similarly number parts in FIGS. 1–5. It will be further noted in FIG. 6 that not only is the ratio of the thickness between the outer bearing race and the thickness of the outer end of hub body 47' substantially different from the ratio T/TR, as set forth above in regard to hub 45 of the present invention, but also rotor body 35' fits tightly against the outer surface of the hub body even in the region of the hub body in which rotor body 35' is axially overlapped with the inner race of bearing 57', as indicated by dimension L3'. In fact, the ratio T/TR in the prior art hub shown in FIG. 6 was typically known to be greater than about 1.1. Thus, the provision of the above-expressed ratio T/TR and the provision of gap G in applicant's rotor assembly 5 result in the unexpected and surprising results of being able to more easily press fit one of the bearings 57 into its respective cylindrical surface 67 of hub body 47 after rotor body 35 has been heat shrunk in place on the exterior surface 55 of the hub when even greater tolerances (i.e., greater variations in dimensions between diameters D1, D2, and D3) are present and also when there is a lesser degree of roundness of these diameters. It will thus be appreciated that the improved rotor assembly and hub of the present invention facilitates assembly, reduces the number of rejected parts, and results in a more economical method of assembling and constructing rotor assemblies 9 for motor 1.

It is submitted that the method of assembling rotor assembly 9 as heretofore generally described, is clearly and concisely set forth in the above description of the apparatus so as to enable one skilled in the art to use the method of this invention for assembling the rotor assembly on the hub. Therefore, for the sake of brevity, a detailed description of the method is not presented herein.

In view of the above, it will be seen that the other objects of this invention are achieved and other advantageous results obtained.

As various changes could be made in the above constructions or methods without departing from the scope of the invention, it is intended that all matter contained in the above description or shown in the accompanying drawing shall be interpreted as illustrative and not in a limiting sense.

I claim:

1. In a dynamoelectric machine having a stator assembly and a rotor assembly, said stator assembly comprising a bearing support, a core affixed to said bearing support, said core comprising a plurality of laminations of suitable ferro-magnetic material, said core having a central bore therethrough, said rotor assembly comprising a rotor body rotatably mounted within said bore of said stator core, said rotor body having a central bore therethrough, said bearing support having a central shaft stationarily fixed relative thereto, the longitudinal centerline of said stationary shaft being substantially coaxial with the central axis of said rotor body and with said bore in said stator core, and means for journalling said rotor body on said stationary shaft, said rotor assembly including a hub having a generally cylindrical hub body which is received in said rotor body bore and on which said rotor body is affixed, said hub being rotatable with said rotor body and said hub body having a longitudinal central opening therethrough for receiving said stationary shaft, a pair of anti-friction roller bearings spaced axially from one another along said stationary shaft, each of said bearings having an outer race engageable with and rotatable with a respective inner surface of said hub body defining said central opening within said cylindrical body of said hub, an inner race engageable with and remaining stationary with said stationary shaft, and a plurality of rolling elements interposed between said inner and outer races, wherein the improvement comprises: an outer cylindrical surface on the exterior of said hub body receiving said rotor body and onto which said rotor body is affixed, and an inner cylindrical surface on the interior of said hub cylindrical body which receives the outer race of one of said bearings upon the press fit of said one bearing into said inner cylindrical surface, said outer and inner cylindrical surfaces of said hub body being spaced axially along said hub body with the diameter of the cylindrical hub body at the axial position of said inner cylindrical surface thereof being smaller than the diameter of said outer cylindrical surface on said hub body on which said rotor body is affixed such that the exterior of the cylindrical hub body at the location of said inner cylindrical surface is clear of said rotor body, and further that the thickness of said hub between the exterior surface of the hub coextensive with said inner cylindrical surface receiving said one bearing being less than about 0.85 times the thickness of the outer race of said one bearing thereby to prevent undue distortion of said one bearing upon the press fit securement of said one bearing into said hub body after said rotor body has been affixed on said hub body.

2. In a dynamo electric machine as set forth in claim 1 wherein said hub has a shoulder thereon defining one end of said outer cylindrical surface of said hub body on which said rotor body is affixed thereon, said shoulder constituting a stop for locating said rotor body upon the placement thereof onto the exterior of said hub, said outer surface being undercut adjacent said shoulder so as to insure said rotor body bears squarely against said shoulder.

3. In a dynamoelectric machine as set forth in claim 1 wherein said outer surface receiving said rotor body and said inner cylindrical surface receiving one bearing are axially contiguous to one another, and wherein the axial length of said rotor body is greater than the axial length of said outer surface such that said rotor body overlaps, at least in part, said inner surface receiving said one bearing, there being a gap between the exterior of said hub body at the location of said inner cylindrical surface receiving said bearing and the inner cylindrical face of said rotor body defining said rotor body bore.

* * * * *

UNITED STATES PATENT AND TRADEMARK OFFICE
CERTIFICATE OF CORRECTION

PATENT NO. : 4,471,250
DATED : September 11, 1984
INVENTOR(S) : S. Duke Snider

It is certified that error appears in the above—identified patent and that said Letters Patent is hereby corrected as shown below:

Column 7, line 18 "heretobefore" should be "heretofore"

Column 8, line 2, "hib" should be "hub"

Signed and Sealed this

Fifth Day of March 1985

[SEAL]

Attest:

DONALD J. QUIGG

Attesting Officer     Acting Commissioner of Patents and Trademarks